United States Patent
Petty, Sr. et al.

(10) Patent No.: US 10,974,840 B2
(45) Date of Patent: Apr. 13, 2021

(54) HEAT SHIELD FOR SIGNATURE SUPPRESSION SYSTEM

(71) Applicant: ROLLS-ROYCE NORTH AMERICAN TECHNOLOGIES INC., Indianapolis, IN (US)

(72) Inventors: Jack D. Petty, Sr., Indianapolis, IN (US); Colin Faucett, Brownsburg, IN (US); Kenneth M Pesyna, Carmel, IN (US); James C. Loebig, Greenwood, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 16/668,345

(22) Filed: Oct. 30, 2019

(65) Prior Publication Data
US 2020/0172258 A1    Jun. 4, 2020

Related U.S. Application Data

(62) Division of application No. 15/661,611, filed on Jul. 27, 2017, now Pat. No. 10,494,116.

(51) Int. Cl.
| | |
|---|---|
| *B64D 33/04* | (2006.01) |
| *F02K 1/82* | (2006.01) |
| *F02C 3/04* | (2006.01) |
| *F02C 7/24* | (2006.01) |
| *B64D 27/12* | (2006.01) |
| *F01D 25/30* | (2006.01) |
| *F01D 9/02* | (2006.01) |

(52) U.S. Cl.
CPC ............ *B64D 33/04* (2013.01); *B64D 27/12* (2013.01); *F01D 9/02* (2013.01); *F01D 25/30* (2013.01); *F02C 3/04* (2013.01); *F02C 7/24* (2013.01); *F02K 1/822* (2013.01); *F02K 1/825* (2013.01); *B64D 2033/045* (2013.01); *F05D 2220/323* (2013.01); *F05D 2230/60* (2013.01); *F05D 2260/231* (2013.01); *F05D 2260/31* (2013.01); *F05D 2260/96* (2013.01)

(58) Field of Classification Search
CPC ... B64D 2033/045; B64D 33/04; F02K 1/825; F02K 1/822; F02K 1/82; F01D 25/30; F01D 25/305; F01D 25/28
See application file for complete search history.

(56) References Cited

U.S. PATENT DOCUMENTS

| | | | | |
|---|---|---|---|---|
| 5,699,662 A | * | 12/1997 | Born | F02K 1/825 60/39.5 |
| 6,199,371 B1 | * | 3/2001 | Brewer | F23R 3/002 60/766 |
| 8,544,255 B2 | * | 10/2013 | Durand | F02K 1/825 60/39.5 |
| 9,422,865 B2 | | 8/2016 | Graves et al. | |

* cited by examiner

*Primary Examiner* — Scott J Walthour
*Assistant Examiner* — Todd N Jordan
(74) *Attorney, Agent, or Firm* — Barnes & Thornburg LLP

(57) ABSTRACT

Devices, systems, and methods of a casing for a heat suppression system of a gas turbine engine exhaust include a heat shield and an insulation layer for arrangement between the heat shield and an outer skin.

16 Claims, 4 Drawing Sheets

HEAT SHIELD FOR SIGNATURE SUPPRESSION SYSTEM

CROSS-REFERENCE TO RELATED APPLICATIONS

This U.S. Non-Provisional Patent Application is a divisional of, and claims the benefit of priority to, U.S. Non-Provisional patent application Ser. No. 15/661,611, entitled HEAT SHIELD FOR SIGNATURE SUPPRESSION SYSTEM, filed on Jul. 27, 2017, the contents of which are incorporated by reference here in their entirety, including but without limitation, those portions concerning heat management.

GOVERNMENT LICENSE RIGHTS

This invention was made with government support under contract no. H2222-16-C-0121 awarded by U.S. Air Force. The U.S. government has certain rights in the invention.

BACKGROUND

The present disclosure relates generally to gas turbine engines, and more specifically to gas turbine engines including heat signature suppression.

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller. The exhaust products from gas turbine engines are typically expelled to atmosphere having considerable temperature.

SUMMARY

The present disclosure may comprise one or more of the following features and combinations thereof.

According to an aspect of the present disclosure, an aircraft may comprise a gas turbine engine including an exhaust system, a heat suppression system fluidly connected with the exhaust system and adapted to inhibit line of sight therein. The heat suppression system may include an outer skin defining a cavity and including at least one mount, an exhaust conduit arranged within the cavity of the outer casing having an exhaust passageway defined therethrough for receiving exhaust of the gas turbine engine, and a vane diffuser arranged within the exhaust passageway of the exhaust conduit. The aircraft may include a shield system having a heat shield and an insulation layer. The shield system may be arranged within the cavity and secured with the outer skin. The heat shield may be arranged between the outer skin and the exhaust conduit and the insulation layer may be disposed between the heat shield and the outer skin, wherein the heat shield may be supported to float relative to the outer skin on the at least one mount.

In some embodiments, the at least one mount may define slanted surfaces for engagement with the heat shield. The heat shield may include a forward sheet and an aft sheet, the forward sheet may be secured to a first surface of the slanted surfaces and the aft sheet may be secured to a second surface of the slanted surfaces. The first and second slanted surfaces may have different pitch.

In some embodiments, the forward sheet and the aft sheet may be arranged to overlap. The forward and aft sheets may be linear between their forward and aft ends. In some embodiments, an air gap may be defined between at least one of the forward and aft sheets and the outer skin.

In some embodiments, the insulation layer may be arranged as a damper absorbing relative movement between the outer skin and the heat shield. The insulation layer may have a spring rate in the range of 25 to 100 lb-force/in.

In some embodiments, the heat shield may be secured with the outer skin with an attachment system including a fastener and a spacer. The fastener may be arranged to penetrate through the heat shield.

According to another aspect of the present disclosure, a casing system for a heat suppression system of a gas turbine engine may comprise an outer skin defining an inner cavity and having at least one mount, a heat shield disposed within the cavity and secured with the outer skin, and an insulation layer disposed between the outer skin and the insulation layer. The heat shield may be supported to float relative to the outer skin on the at least one mount.

In some embodiments, the at least one mount may define slanted surfaces for engagement with the heat shield. In some embodiments, the heat shield may include a forward sheet and an aft sheet, the forward sheet may be secured to a first surface of the slanted surfaces and the aft sheet may be secured to a second surface of the slanted surfaces. The first and second slanted surfaces may have different pitch.

In some embodiments, the forward sheet and the aft sheet may be arranged to overlap. The forward and aft sheets may be linear extending between their forward and aft ends. In some embodiments, a gap may be defined between at least one of the forward and aft sheets and the outer skin.

In some embodiments, the insulation layer may arranged as a damper absorbing relative movement between the outer skin and the heat shield. The insulation layer may have a spring rate in the range of 25 to 100 lb-force/in.

In some embodiments, the heat shield may be secured with the outer skin with an attachment system including a fastener and a spacer. The fastener may be arranged to penetrate through the heat shield.

According to another aspect of the present disclosure, a method of forming a casing may comprise mounting a first sheet of a heat shield to a first surface of an outer skin, mounting a second sheet of a heat shield to a second surface of an outer skin, and compressing a damper arranged between the heat shield and the outer skin. In some embodiments, mounting at least one of the first and second sheets may include warping the at least one of the first and second sheets to have curvature corresponding to the outer skin.

According to another aspect of the present disclosure, a heat protection system may comprise a composite layer, a heat shield layer secured with the composite layer, and a damper layer disposed between the composite layer and the heat shield. In some embodiments, an air gap may be defined between at least a portion of the composite layer and at least a portion of the composite layer.

These and other features of the present disclosure will become more apparent from the following description of the illustrative embodiments.

DETAILED DESCRIPTION OF THE DRAWINGS

Figure 1:
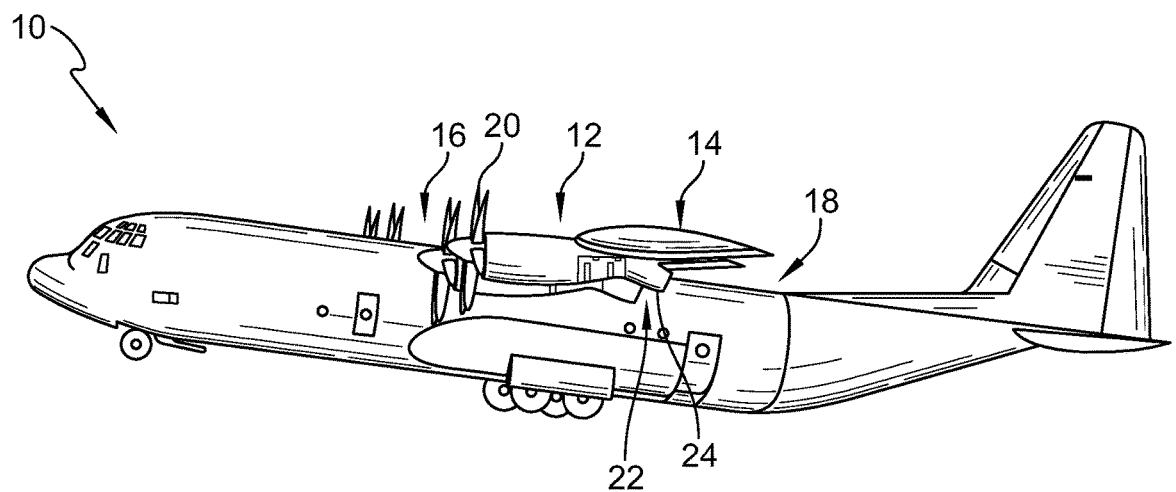
FIG. 1 is an perspective view of an aircraft showing that the aircraft includes a gas turbine engine adapted to provide thrust for propelling the aircraft and showing that the engine includes a heat signature suppression system attached to an aft end (rear) of the engine.

For the purposes of promoting an understanding of the principles of the disclosure, reference will now be made to a number of illustrative embodiments illustrated in the drawings and specific language will be used to describe the same.

Gas turbine engines combust a mixture of fuel and compressed air into exhaust products that produce rotational force by expanding through a turbine section of the engine. The exhaust products which exit gas turbine engines typically have high temperatures. The high temperature exhaust products from gas turbine engines and high temperature components within and around the gas turbine engines can be detected by heat detecting systems as heat signatures. Non-limiting examples of such detection systems may include infrared (IR) detection systems.

Gas turbine engines can be adapted to provide power and/or thrust for vehicles, for example, aircraft. Vehicle presence can be determined by detecting the heat signature of adapted gas turbine engines. By cooling and/or reducing line of sight to high temperature components and fluids (regions), heat signatures of gas turbine engines can be reduced and a vehicle's presence can be inhibited.

However, such high temperature regions can create difficulties in designing structural assemblies. For example, thermal soakback (generally known as transient conditions immediately following engine slowdown/shut down, where heat has little or no active mechanism to exit the engine) can be created under low engine load conditions and can result in over temperature conditions. Over temperature conditions can required costly materials, design, and/or can be detrimental to performance and/or lifetime of components. The present disclosure includes devices, systems, and methods for enduring the full range of operational conditions of the gas turbine engine.

As shown in FIG. 1, an illustrative aircraft 10 includes gas turbine engines 12 for providing thrust for aircraft flight. In the illustrative embodiment, the aircraft 10 is embodied to include four gas turbine engines 12 each secured underneath wings 14. In some embodiments, any suitable number and/or arrangement of engines 12 can be utilized. The following description is provided regarding a single gas turbine engine 12, but may apply equally to all engines 12.

As shown in FIG. 1, the gas turbine engine 12 illustratively includes a forward end 16 and an aft end 18. The gas turbine engine 12 illustratively includes a compressor, combustor, and turbine section for respectively compressing air, combusting air/fuel mixture to produce combustion (exhaust) products, and expanding the exhaust products to drive rotation of the turbine section. The gas turbine engine 12 is illustratively embodied to include a propeller 20 arranged near the forward end 16 thereof and adapted for driven rotation by a shaft of the turbine section of the gas turbine engine 12. Rotation of the propeller 20 illustratively provides thrust to propel the aircraft 10. In some embodiments, the gas turbine engine 12 may be any suitable type and/or arrangement, including but not limited, to turboprop, turbofan, and turbojet engines.

As shown in FIG. 1, the gas turbine engine 12 illustratively includes an exhaust outlet 32 arranged near the aft end 18 for expelling exhaust products from the engine 12. Exhaust products that have been expanded to drive rotation of the turbine section are illustratively discharged from the exhaust outlet 32 to the atmosphere. Gas turbine engine exhaust products, by themselves, can have considerable temperature, on the order of 700° F., which creates a significant heat signature that can be detected. Moreover, hot components and products with the engine can be more easily detected if there line of sight through the exhaust outlet is permitted.

As shown in FIG. 1, the gas turbine engine 12 illustratively includes a heat signature suppression system 24 for reducing the heat signature created by the gas turbine engine 12 to inhibit detection. The heat signature suppression system 24 is illustratively secured to the aircraft 10 near the aft end 18 of the engine 12 to receive exhaust products from the engine 12. The heat signature suppression system 24 illustratively reduces the impact of the heat signature from the engine 12 by cooling and/or inhibiting line of sight to hot fluids and components.

Figure 2:
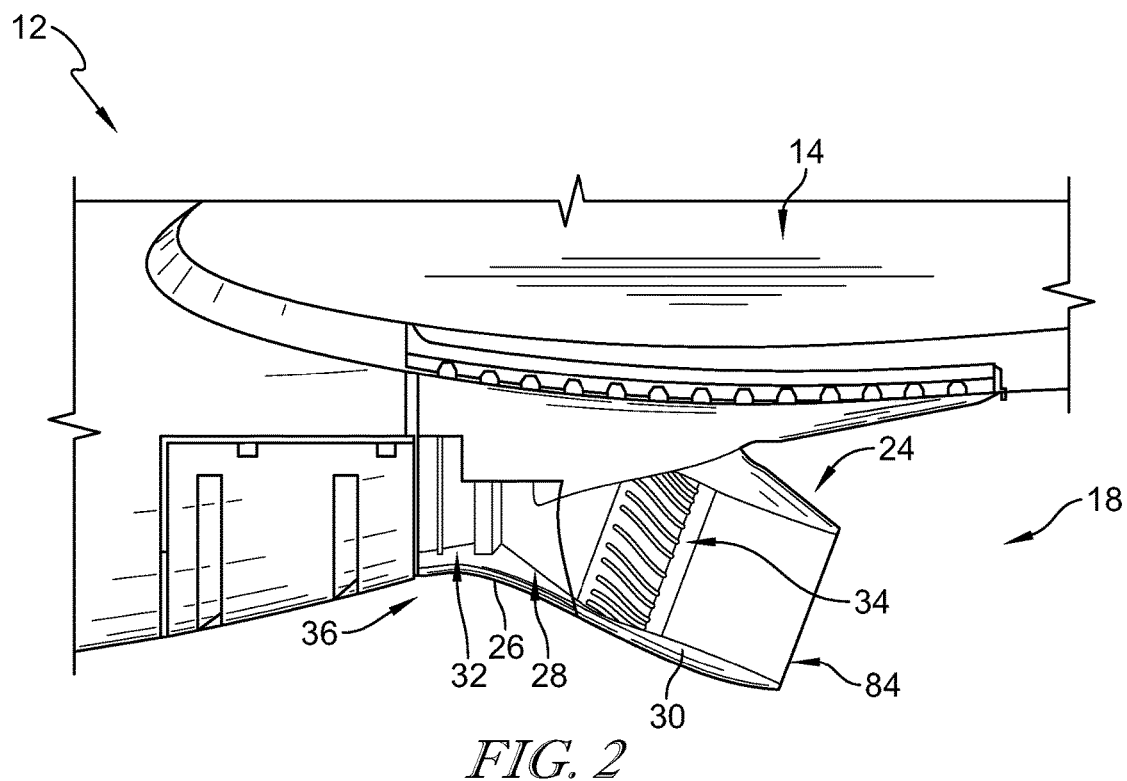
FIG. 2 is a side view of the heat signature suppression system of FIG. 1 with a portion of an outer casing rendered transparent to show that the heat signature suppression system includes an exhaust conduit connected to an outlet of the engine to receive exhaust products therefrom and a diffuser arranged within the exhaust conduit to receive and mix together the exhaust products and a flow of coolant to reduce temperature, and showing a heat shield system include a heat shield arranged to provide heat protection to the outer casing.

As shown in FIG. 2, the heat signature suppression system 24 illustratively includes an outer casing 26 defining a cavity 28 therein. The outer casing 26 is illustratively shown with a portion rendered transparent to reveal an exhaust conduit 30 arranged within the cavity 28 of the outer casing 26 to pass exhaust products from the exhaust system outlet 32 of the engine 12 through the heat signature suppression system to an outlet 84 for discharge to atmosphere. The heat signature suppression system 24 illustratively includes a diffuser 34 arranged within the exhaust conduit 30 to receive exhaust products for mixing with coolant and to inhibit line of sight into the gas turbine engine 12 through the outlet 84.

As shown in FIG. 2, a heat shield system 36 is illustratively arranged within the cavity 28. The heat shield system 36 is illustratively positioned forward of the diffuser 34 and/or near the connection between the exhaust conduit 30 and the outlet 32 of the engine 12. The heat shield system 36 provides protection against heat from the exhaust products.

Figure 3:
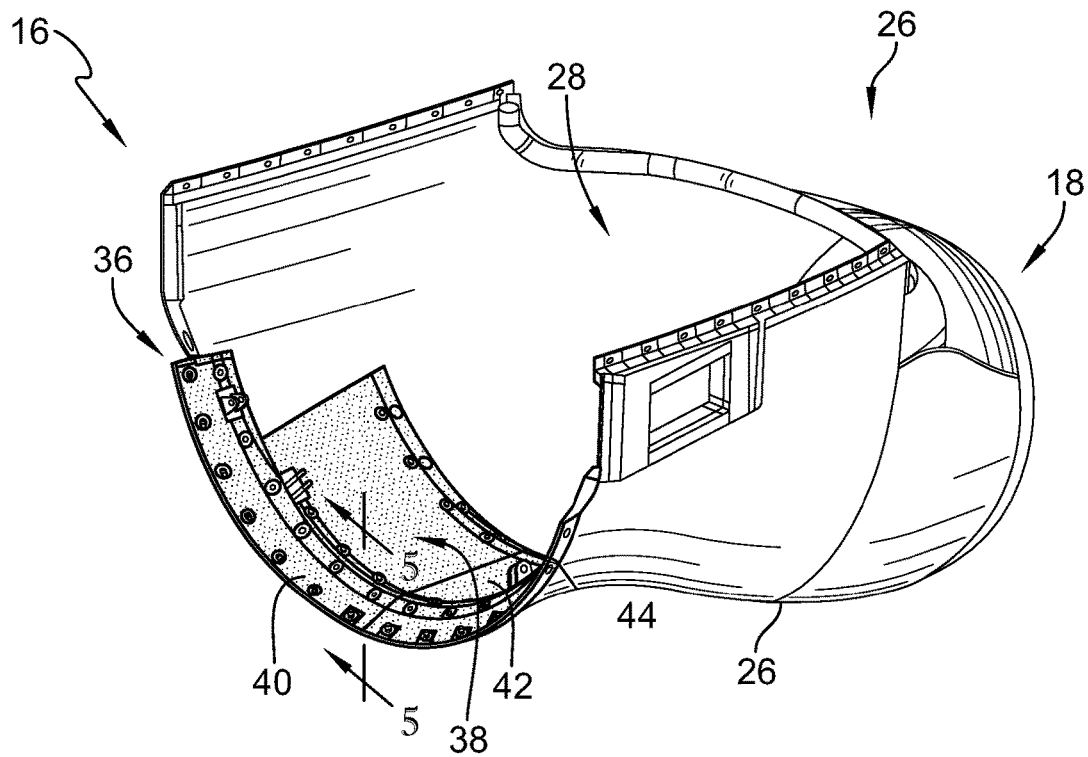
FIG. 3 is a perspective view of a portion of the outer casing separated from the aircraft of FIGS. 1 and 2, showing that the heat shield is secured within a cavity of the outer casing with curvature (lateral) corresponding to the outer casing.

As shown in FIG. 3, a portion of the outer casing 26 is shown removed from the aircraft 10 for descriptive and illustrative convenience. The heat shield system 36 illustratively includes a heat shield 38 (shown with illustrative fill in FIG. 3 for convenience). The heat shield 38 is illustratively arranged within the cavity 28 between the outer casing 26 and the exhaust conduit 30.

Figure 4:
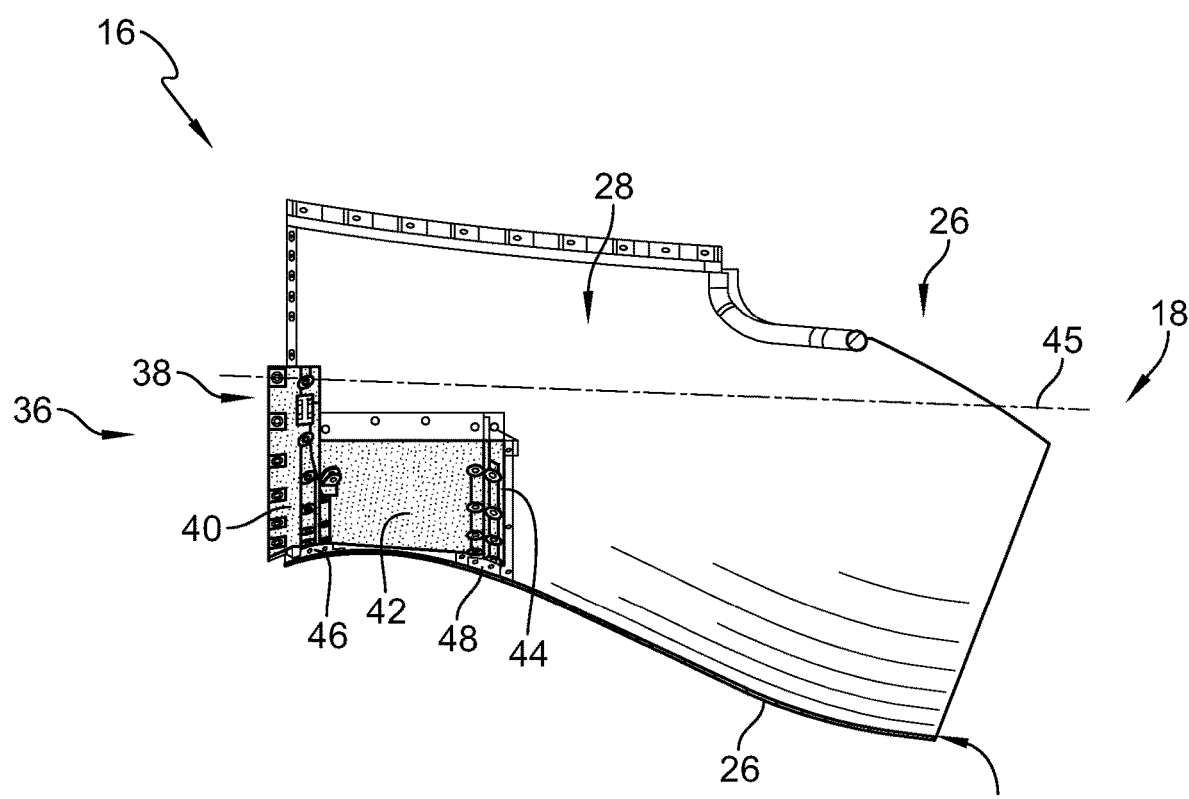
FIG. 4 is a side elevation view of the portion of the outer casing of FIG. 3 with a portion of the outer casing rendered transparent to show the heat shield system and showing that the heat shield includes sheets having curvature corresponding to an axis (dashed line) of the center of curvature of the outer casing near the heat shield.

As shown in FIG. 4, the heat shield 38 is illustratively formed from a number of sheets 40, 42, 44. The sheets 40, 42, 44 each illustratively include curvature complimentary to the curvature of the cavity 28 and/or outer casing 26. For illustrative convenience, the curvature of the sheet 40, 42, 44 may be formed relative to an axis 45 shown to illustrate the center of curvature of the outer casing 26 near the heat shield system 36 (although the curvature of the outer casing 26 may vary from forward to aft ends). As explained in additional detail herein, the heat shield 38 is secured with the outer casing 26 with a floating arrangement to provide heat protection and accommodate relative movement, such as thermal growth.

Figure 5:
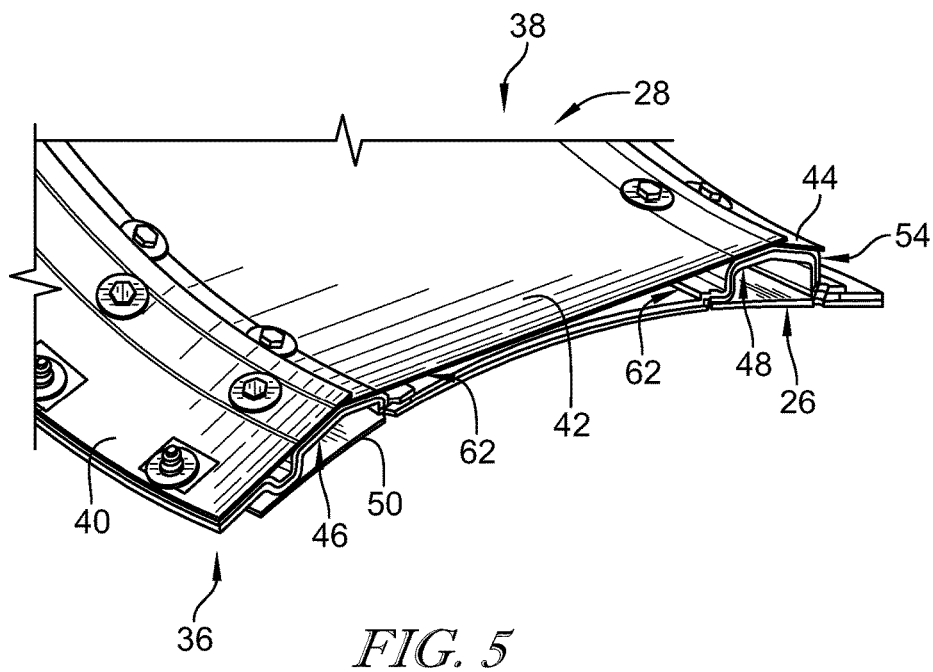
FIG. 5 is perspective view of the heat shield system in cross-section along the line 5-5 to show that the sheets of the heat shield are linear along the forward-to-aft direction (left to right)

Referring to FIG. 5, as mentioned above, the heat shield 38 is supported by the outer casing 26 in a floating arrangement. The outer casing 26 illustratively includes mounts 46, 48 arranged within the cavity 28. The outer casing 26 illustratively includes an exterior layer 50 and each mount 46, 48 projects from an interior side of the exterior layer 50 into the cavity 28.

Figure 6:
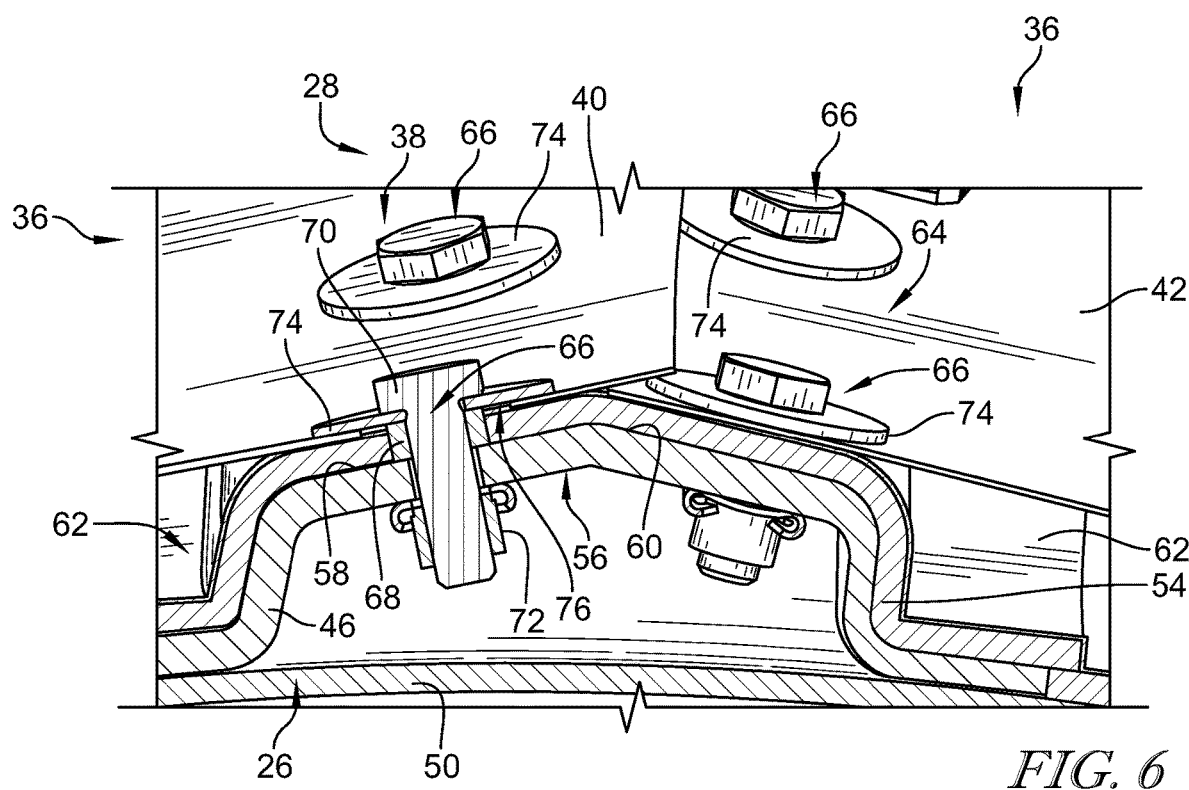
FIG. 6 is a closer side elevation view of the cross-section of FIG. 5 showing that the heat shield system includes an insulation layer between the outer casing and the heat shield, and showing that an attachment system secures the heat shield with the outer casing in a floating arrangement.

In the illustrative embodiment as shown in FIG. 6, the mounts 46, 48 are formed as U-channels extending circumferentially about the cavity 28 (with curvature of the outer casing 26). The mounts 46, 48 illustratively provide structural integrity to the outer casing 26 and mounting points for the heat shield 38, although in some embodiments, distinct structure and mounting points may be included. The mounts 46, 48 each illustratively includes a platform 56 defining mount surfaces 58, 60 for supporting the heat shield 38. The mount surfaces 58, 60 are illustratively formed as slanted surfaces oriented to accommodate positioning of the sheets 40, 42, 44. The mount surface 58 is illustratively forward of the mount surface 60 and slopes towards forward while the mount surface 60 illustratively slopes aftward. The sheet 40 is illustratively engaged with the mount surface 58 while the sheet 42 is engaged with the mount surface 60.

The relatively linear engagement between the mounting surfaces and their respective sheets permits securing of the heat shield 38 with the outer casing 26 with complimentary curvature, as mentioned above. By allowing the linear engagement, the sheets 40, 42, 44 can be installed (warped) directly into place as linear segments (along the forward and aft directions) with an overlap arrangement (as best seen in FIG. 6, cascading in the aftward direction). The overlap arrangement can provide heat protection without requiring extensive mechanical contouring of the heat shield 38 to conform with the cavity 28. As best shown in FIG. 6, gaps 62 are illustratively defined between at least portions of the heat shield 38 and the outer casing 26. The gaps 62 can assist in thermal insulation and/or in accommodating movement between the heat shield 38 and the outer casing 26. In the illustrative embodiment, the mount 48 and its connection with the heat shield 38 is similar to the mount 46 except as indicated otherwise.

As shown in FIG. 6, an insulation layer 54 is illustratively arranged between the outer casing 26 and the heat shield 38. The insulation layer 54 is illustratively formed as a thermal insulator to resist heat transfer. The insulation layer 54 is also illustratively formed as a resilient member having a spring rate in compression to provide dampening of movement between the heat shield 38 and the outer casing 26. The insulation layer 54 is illustratively embodied as a spray-on foam having a spring rate within the range of about 25 to 100 lb-force/in. In some embodiments, thermal insulation and dampening may be provided wholly or partly by distinct layers and/or any other suitable members. One example of a suitable insulation material for use in insulation layer 54 is MI-15® insulation as marketed by Lockheed Martin of Bethesda, Md.

Referring to FIG. 6, the heat shield system 36 illustratively includes an attachment system 64 for securing the heat shield 38 with the outer casing 26. The attachment system 64 illustratively includes fasteners 66 and spacers 68. Each fastener 66 illustratively includes a bolt 70 that extends through the heat shield 38 and is secured with the outer casing 26 by a nut 72 (illustratively opposite the mount surface 58, 60). The spacer 68 illustratively provides a mechanical limit to the compression of the fastener 66. The spacer 68 is illustratively formed of low thermal expansion ceramic, but in some embodiments, may include any suitable material.

As shown in FIG. 6, the attachment system 64 illustratively includes washers 74. The washers 74 are illustratively sized larger than holes 76 of the heat shield 38 through which the fasteners 66 penetrate. In the illustrative embodiment, the ceramic spacers 68 are sized smaller than the hole 76 and extends therethrough to contact the washer 74. Each washer 74 is illustratively engaged with the heat shield 38 on an inner side (within the cavity 28) and engages with the corresponding mount surface 58, 60 of the respective mount 46, 48. As shown in FIG. 6, a number of fasteners 66 secure the sheets 40, 42, 44 to the mount surfaces 58, 60 along the curvature of the mounts 46, 48. The use of an oversize washer in combination with a large clearance hole can accommodates relative movement between the heat shield 38 and outer casing 26, for example, disparate thermal growth.

Referring briefly to FIG. 5, the sheet 40 is most forward of the sheets and is illustratively secured only on an aft end to the mount 46. The sheet 42 is illustratively aft of sheet 40 and extends between and is secured to each of the mounts 46, 48. The sheet 44 is illustratively most aftward of the sheets and is illustratively secured only on a forward end to the mount 48. The aftward end of sheet 40 is illustratively arranged inward of the forward end of the sheet 42, and the aftward end of sheet 42 is illustratively arranged inward of the forward end of the sheet 44, to create overlapping arrangement in the aftward direction.

In the illustrative embodiment, the heat shield 38 is illustratively formed of a high temperature resilient material, for example, titanium, but in some embodiments may include any suitable material. The outer casing 26, and namely the exterior layer 50, is illustratively formed of a carbon fiber reinforced composite having lower temperature capability than the heat shield 38. Because the heat shield 38 can protect the outer casing 26 from the highest temperatures (including soakback temperatures), the outer casing can be formed of materials that are less heat resilient, less costly, more available, and/or more easily configured.

Figure 7:
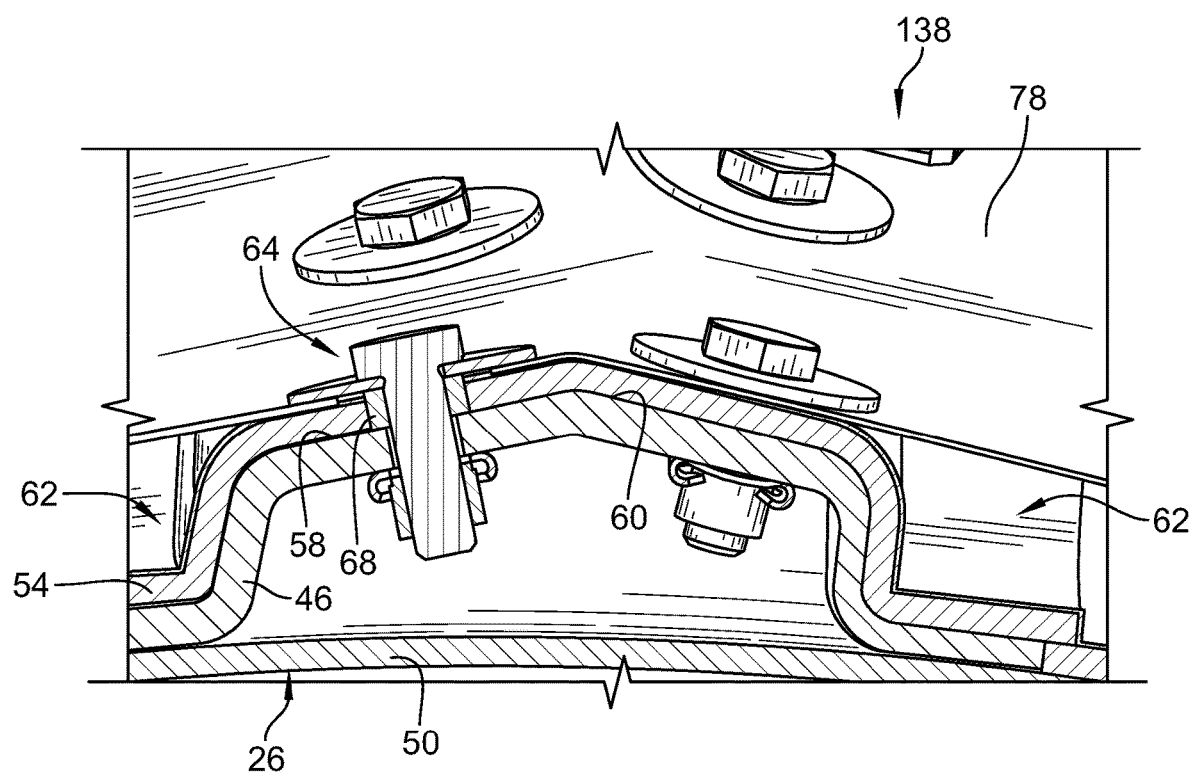
FIG. 7 is another embodiment of a heat shield of the heat shield system of FIGS. 2-6 showing that heat shield includes a bent sheet conforming with the forward-to-aft curvature of the outer casing.

In another illustrative embodiment as shown in FIG. 7, a heat shield 138 may illustratively formed as at least one bent sheet 78. The heat shield 138 illustratively includes the insulation layer 54 and is illustratively secured with the mounts 46, 48 in similar manner as the heat shield 38.

Unlike the heat shield 38, heat shield 138 illustratively includes pre-formed bends along the forward to aft direction, and in the circumferential direction to conform with the outer casing 26.

As previously mentioned the diffuser 34 is illustratively arranged within the exhaust conduit 30. The diffuser 34 can includes a diffuser body and fins (outer radial ends indicated in FIG. 2) extending radially from and distributed circumferentially about the body. The fins can assist to mix cooling fluid with exhaust products flowing through the exhaust conduit 30. The fins can illustratively include curvature (serpentine along the axial direction) and can be arranged to visually overlap their adjacent fins to obscure line-of-sight forward towards the engine 12 through the main outlet 84.

The present disclosure includes devices, systems, and methods for infrared heat suppression systems for aircraft, for example, for the AC130-W. The present disclosure includes an InfraRed Suppressor (IRS) that may include an aircraft mounted Primary Duct Assembly and a Structural Fairing. The Structural Fairing may include a lower temperature capable (600 F) Carbon Fiber reinforced composite skin that is mounted directly to the airframe, and in-turn may provide mounting features that support the Primary Duct Assembly. Hot air exiting the main propulsion (for example, a T56 gas turbine engine) may be channeled through the Primary Duct Assembly and subsequently cooled before exiting the exhaust system. The Structural Fairing may surround the Primary Duct Assembly and may provide inlet scoops to channel cool ambient air through the annulus between the Structural Fairing and Primary Duct during aircraft operation.

Thermal heat load (radiation & convection) may emanates from the Primary Duct and may reach the composite skin, especially during low speed ground idle and thermal soakback conditions. Soakback may refer to the transient condition immediately following engine shut down, where latent heat may have no active mechanism to exit the engine and IRS assembly. The present disclosure may address over temperature conditions of the composite by the addition of a heat shield off the inner surface of the composite and facing the Primary Duct Assembly. In some embodiments, the heat shield may be metallic.

The heat shield may be suspended off the surface via attachment bolts and large diameter "fender" washers. Due to temperature differences between the composite colder outer skin and the hotter heat shields, an over-size clearance hole may be included at fastener locations. Each fastener location may utilize an oversize washer (fender washer) to retain the heat shield, while allowing it to float to accommodate relative thermal growths. In addition, the attachment grip may feature a bolt, a ceramic spacer, the oversize metal washer, and a Fairing stiffener. The surface of the composite Fairing that contacts the metal heat shield may be covered with commercially available low conductivity foam insulation.

In some embodiments, the attachment assembly 64 may be installed to have a pre-load on the insulation layer 54 in order to assist dampening relative movements, for example, thermal movements, and/or engine and/or propeller induced vibration. The present disclosure includes utilizing a low thermal expansion ceramic spacer to partially offset the high thermal growth of the composite, in the thickness direction, from the heat shield; thereby preventing crushing of the composite in the bolt grip. The present disclosure includes providing thermal protection for the lower temperature capable Carbon Fiber reinforced composite duct during high temperature events including low speed ground idle and thermal soakback conditions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A casing system for a heat suppression system of a gas turbine engine, the casing system comprising:
    an outer skin defining an inner cavity and having at least one mount,
    a heat shield disposed within the inner cavity and secured with the outer skin, and
    an insulation layer disposed between the outer skin and the heat shield,
    wherein the heat shield is supported to float relative to the outer skin on the at least one mount, wherein the at least one mount defines slanted surfaces for engagement with the heat shield,
    wherein the heat shield includes a forward sheet and an aft sheet, the forward sheet secured to a first surface of the slanted surfaces and the aft sheet secured to a second surface of the slanted surfaces, wherein the first and second slanted surfaces have different pitch.

2. The casing system of claim 1, wherein the forward sheet and the aft sheet are arranged to overlap.

3. The casing system of claim 1, wherein the forward sheet is arranged to overlap the aft sheet to cascade in an aftward direction.

4. The casing system of claim 1, wherein the forward sheet and the aft sheet each have a forward end and an aft end, wherein at least one of the forward sheet and the aft sheet is linear extending between the respective forward and aft ends of the at least one of the forward sheet and the aft sheet.

5. The casing system of claim 1, wherein at least one of the forward sheet and the aft sheet have curvature complementary with the outer skin.

6. The casing system of claim 1, wherein a gap is defined between the outer skin and at least one of the forward sheet and the aft sheet.

7. The casing system of claim 1, wherein gaps are defined between the outer skin and each of the forward sheet and the aft sheet.

8. The casing system of claim 1, wherein the insulation layer is arranged as a damper configured to absorb relative movement between the outer skin and the heat shield.

9. The casing system of claim 8, wherein the insulation layer has a spring rate in the range of 25 to 100 lb-force/in.

10. The casing system claim 1, wherein the heat shield is secured with the outer skin with an attachment system including a fastener and a spacer, the fastener penetrating through the heat shield.

11. A method of forming a casing, the casing system comprising:
    an outer skin defining an inner cavity and having at least one mount,
    a heat shield disposed within the inner cavity and secured with the outer skin, and
    an insulation layer disposed between the outer skin and the heat shield, wherein the heat shield is supported to float relative to the outer skin on the at least one mount, wherein the at least one mount defines slanted surfaces for engagement with the heat shield, wherein the heat shield includes a first sheet and a second sheet, the first sheet secured to a first surface of the slanted surfaces and the second sheet secured to a second surface of the slanted surfaces, wherein the first and second slanted surfaces have different pitch, the method comprising mounting the first sheet to the first surface, mounting the second sheet to the second surface, and arranging the insulation layer between the heat shield and the outer skin.

12. The method of claim 11, wherein at least one of mounting the first sheet and mounting the second sheet includes compressing the insulation layer as a damper.

13. The method of claim 12, wherein mounting the first sheet and mounting the second sheet includes compressing the insulation layer as the damper.

14. The method of claim 11, wherein mounting the first sheet includes warping the first sheet to have a curvature corresponding to the outer skin and/or wherein mounting the second sheet includes warping the second sheet to have curvature corresponding to the outer skin.

15. The method of claim 14, wherein mounting the first sheet includes warping the first sheet to have a curvature corresponding to the outer skin and wherein mounting the second sheet includes warping the second sheet to have curvature corresponding to the outer skin.

16. The method of claim 11, wherein the first sheet and the second sheet each have a forward end and an aft end, where at least one of the first sheet and the second sheet is linear extending between the respective forward and aft ends of the at least one of the forward sheet and the aft sheet.

* * * * *